United States Patent [19]

Hatta et al.

[11] Patent Number: 5,515,520
[45] Date of Patent: May 7, 1996

[54] DATA PROCESSING SYSTEM FOR SINGLE-PRECISION AND DOUBLE-PRECISION DATA

[75] Inventors: Koichi Hatta, Inagi; Koichi Kuroiwa, Yokohama, both of Japan

[73] Assignee: Fujitsu Limited, Kanagawa, Japan

[21] Appl. No.: 337,411

[22] Filed: Nov. 7, 1994

Related U.S. Application Data

[63] Continuation of Ser. No. 735,583, Jul. 25, 1991, abandoned.

[30] Foreign Application Priority Data

Jul. 26, 1990 [JP] Japan .................................. 2-198547

[51] Int. Cl.⁶ .................................................. G06F 3/00
[52] U.S. Cl. ..................... 395/375; 364/DIG. 1; 364/DIG. 2
[58] Field of Search .................................. 364/748, 749, 364/760, 258.2, 745, 754, 757; 395/375

[56] References Cited

U.S. PATENT DOCUMENTS

| | | | |
|---|---|---|---|
| 4,366,548 | 12/1982 | Kregness et al. . | |
| 4,612,628 | 9/1986 | Beauchamp et al. | 364/748 |
| 4,675,809 | 6/1987 | Omoda et al. | 395/375 |
| 4,825,401 | 4/1989 | Ikumi | 364/760 |
| 4,949,291 | 8/1990 | Saini | 364/715.03 |
| 4,953,119 | 8/1990 | Wong et al. | 364/754 |
| 5,187,795 | 2/1993 | Balmform et al. | 395/800 |
| 5,268,855 | 12/1993 | Mason et al. | 364/748 |
| 5,341,506 | 8/1994 | Nohmi et al. | 395/800 |

FOREIGN PATENT DOCUMENTS

| | | |
|---|---|---|
| 0119016 | 9/1984 | European Pat. Off. . |
| 59-180732 | 10/1984 | Japan . |
| 61-94144 | 5/1986 | Japan . |

*Primary Examiner*—Parshotam S. Lall
*Assistant Examiner*—Zarni Maung
*Attorney, Agent, or Firm*—Nikaido, Marmelstein, Murray & Oram

[57] ABSTRACT

A data processing system includes a single-precision operation unit, a double-precision operation unit, a single-precision data to double-precision data conversion unit, and a double-precision data to single-precision data conversion unit. When two single-precision operations are simultaneously carried out, the single-precision operation unit performs a single-precision operation upon a group of single-precision data, and the double-precision operation unit with the single-precision data to double-precision data conversion unit and the double-precision data to single-precision data conversion unit perform a single-precision operation upon the other group of single-precision data. When a double-precision operation is carried out, the double-precision operation unit performs a double-precision operation upon a group of double-precision data.

6 Claims, 12 Drawing Sheets

S: SIGN
E: EXPONENTIAL PART
M: MANTISSA PART

DATA PROCESSING SYSTEM FOR SINGLE-PRECISION AND DOUBLE-PRECISION DATA

This application is a continuation of application Ser. No. 07/735,583 filed Jul. 25, 1991, now abandoned.

BACKGROUND OF THE INVENTION

1. Field of the Invention

The present invention relates to a data processing system for use in the processing of single-precision data such as 32-bit floating-point representation data and double-precision data such as 64-bit floating-point representation data.

2. Description of the Related Art

Recently, as the amount of data processed in computers having a high functionality and high performance is increased, there is a growing need to effectively carry out the processing of logic calculations and arithmetic calculations, such as scientific calculations, at a high speed. Accordingly, vector processors are used to process single-precision data and double-precision data through pipelines such as an add pipeline, a multiply pipeline, and a division pipeline.

In a prior art vector processor, a double-precision operation unit such as an adder unit also processes single-precision data. To accomplish this, in a single-precision operation mode, a single-precision data to double-precision data conversion unit and a double-precision data to single-precision data conversion unit are connected to a prestage and a poststage of the double-precision operation unit, respectively, as will be later explained in more detail.

In the above-mentioned prior art vector processor, however, a space (or unused memory area) is generated in the memory region of the vector registers, and double-precision transmission lines between the vector registers and the double-precision operation unit.

Also, in the above-mentioned prior art vector processor, it is possible to transmit two single-precision data through the double-precision transmission lines, to the double-precision operation unit. In this case, however, since only one single-precision data can be processed by the double-precision operation unit, the processing of the other single-precision data must be delayed until processing of the first single-precision data is completed, which is an obstacle to an enhancing of the operation speed.

SUMMARY OF THE INVENTION

Therefore, an object of the present invention is to provide a data processing system, such as a vector processor, which does not generate a space (or unused memory area) in the memory region and the double-precision transmission lines and can process single-precision data at a high speed.

According to the present invention, a data processing system includes a single-precision operation unit, a double-precision operation unit, a single-precision data to double-precision data conversion unit, and a double-precision data to single-precision data conversion unit. When two single-precision operations are simultaneously carried out, the single-precision operation unit performs a single-precision operation upon a group of single-precision data, and the double-precision operation unit with the single-precision data to double-precision data conversion unit and the double-precision data to single-precision data conversion unit perform a single-precision operation upon the other group of single-precision data. On the other hand when a double-precision operation is carried out, the double-precision operation unit performs a double-precision operation upon a group of double-precision data.

Due to the presence of two substantial single-precision operation units, it is possible to transmit two single-precision data through the double-precision transmission lines thereto, and further, such two single-precision data can be simultaneously processed to thereby enhance the operation speed. Further, to carry out a transmission of two single-precision data, such two single-precision data can be stored in one double-precision data region of the memory, i.e., the vector registers, and thus full use is made of the memory.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENT

Before the description of an embodiment of the present invention, a prior art data processing system (vector processor) will be explained with reference to FIGS. 1 through 4.

Figure 1:
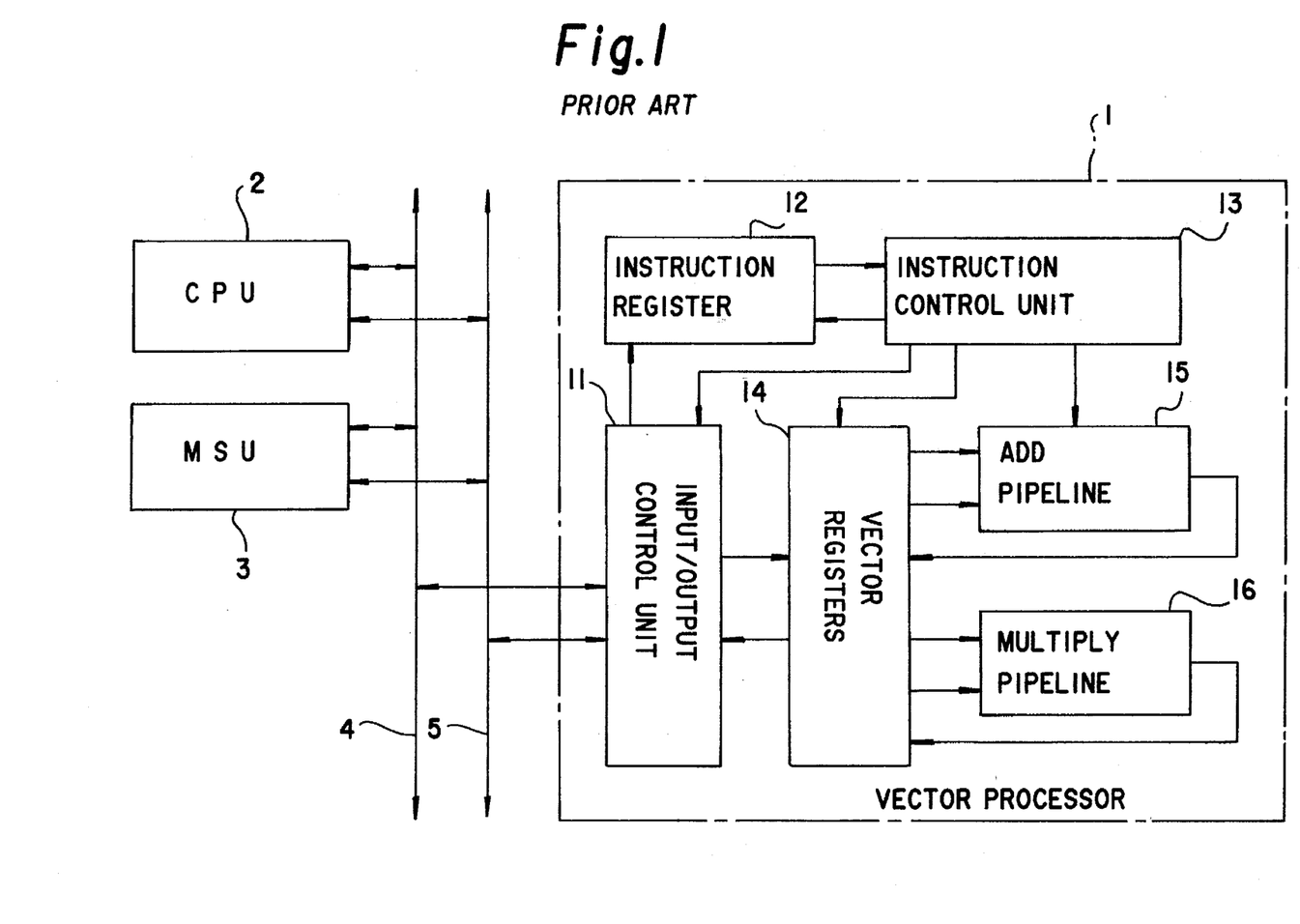
FIG. 1 is a block circuit diagram illustrating a prior art data processing system.

In FIG. 1, which illustrates a prior art data processing system, reference numeral 1 designates a one-chip vector processor connected to a central processing unit (CPU) 2 and a main storage unit (MSU) 3 by an address bus 4 and a data bus 5.

The vector processor 1 includes an input/output control unit 11, an instruction register 12, an instruction control unit 13, vector registers 14, an add operation pipeline 15 a multiply operation pipeline 16.

The vector registers 14 interleave four ways, i.e., are divided into four blocks which can be independently accessed. Also, each of the vector registers 14 designated by VR0, VR1, ... VRn (see FIG. 3A) includes 4 elements, each of which corresponds to a double-precision data such as a 64-bit data.

The CPU2 transmits a sequence of instructions, via the input/output control unit 11, to the instruction register 12, and the CPU 2 further transmits data via the input/output control unit 11 to the vector registers 14. The instructions are as follows:

(1) Operation data load instruction;

(2) Operation instruction such as an add operation instruction and a multiply operation instruction;

(3) Operation result store instruction; and (4) Stop instruction

Next, when the CPU 2 activates the vector processor 1, the instruction control unit 13 fetches an instruction from the instruction register 12 to transmit various control signals to the input/output control unit 11, the vector registers 14, the add operation pipeline 15, and the multiply operation pipeline 16.

For example, if a fetched instruction is a operation load instruction, control signals are transmitted from the instruction control unit 13 to the input/output control unit 11 and the vector registers 14, and as a result, data of the MSU 3 is stored via the input/output control unit 11 to the vector registers 14.

If a fetched instruction is an add operation instruction, control signals are transmitted from the instruction control unit 13 to the vector registers 14 and the add operation pipeline 15, and as a result, data of the vector registers 14 is added at the add operation pipeline 15, and the resultant data is stored in the vector registers 14. Note that such control signals include a signal indicating a single-precision operation mode or a double-precision operation mode.

If a fetched instruction is a multiply operation instruction, control signals are transmitted from the instruction control unit 13 to the vector registers 14 and the multiply operation pipeline 16, and as a result, data of the vector registers 14 is multiplied at the multiply operation pipeline 16, and the resulting data is stored in the vector registers 14. Note that such control signals also include a signal indicating a single-precision operation mode or a double-precision operation mode.

If a fetched instruction is an operation result store instruction, control signals are transmitted from the instruction control unit 13 to the input/output control unit 11 and the vector registers 14, and as a result, data of the vector registers 14 is stored in the MSU 3.

Further, if a fetched instruction is a stop operation, control signals are transmitted from the instruction control unit 13 to the units 11, 14, 15, and 16, and as a result, the operation of the vector processor 1 is completed.

The add operation pipeline 15 carries out a vector processing such as $$\text{DO 10 I} = 0, 7$$
$$C(I) = A(I) \times B(I)$$
$$\text{10 CONTINUE}$$

That is, the add operation pipeline 15 performs a plurality of add operations, simultaneously upon a plurality of data. Similarly, the multiply operation pipeline 16 carries out a vector processing such as $$\text{DO 10 I} = 0, 7$$
$$F(I) = D(I) \times E(I)$$
$$\text{10 CONTINUE}$$

That is, the multiply operation pipeline 16 performs a plurality of multiply operations, simultaneously upon a plurality of data.

Figure 2A:
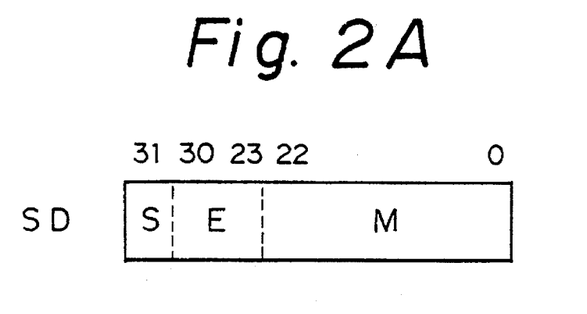
FIGS. 2A and 2B are data formats of examples of single-precision data and double-precision data, respectively.
Figure 2B:
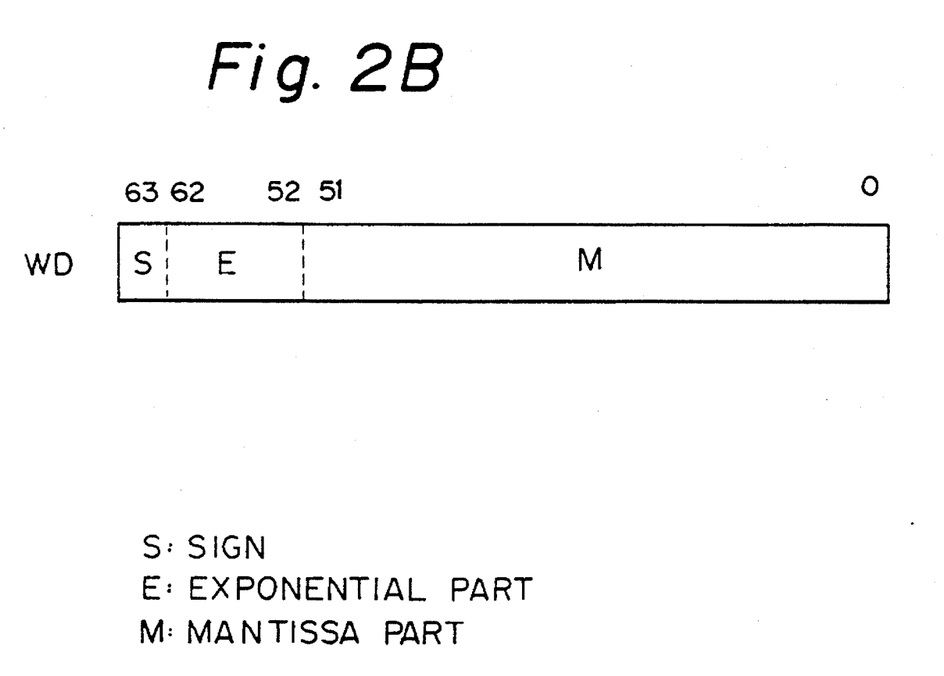

Hereinafter, a single-precision data SD is represented by a 32-bit data as shown in FIG. 2A, and a double-precision data WD is represented by a 64-bit data as shown in FIG. 2B. That is, in FIG. 2A, a 31-th bit (MSB) designates a sign S; the 30-th to 23-th bits designate an exponential part E, and the 22-th to 0-th bits designate a mantissa part M. Similarly, in FIG. 2B, a 63-th bit (MSB) designates a sign S; the 62-th to 52-th bits designate an exponential part E, and the 51-th to 0-th bits designate a mantissa part M.

Figures 3, 3A:
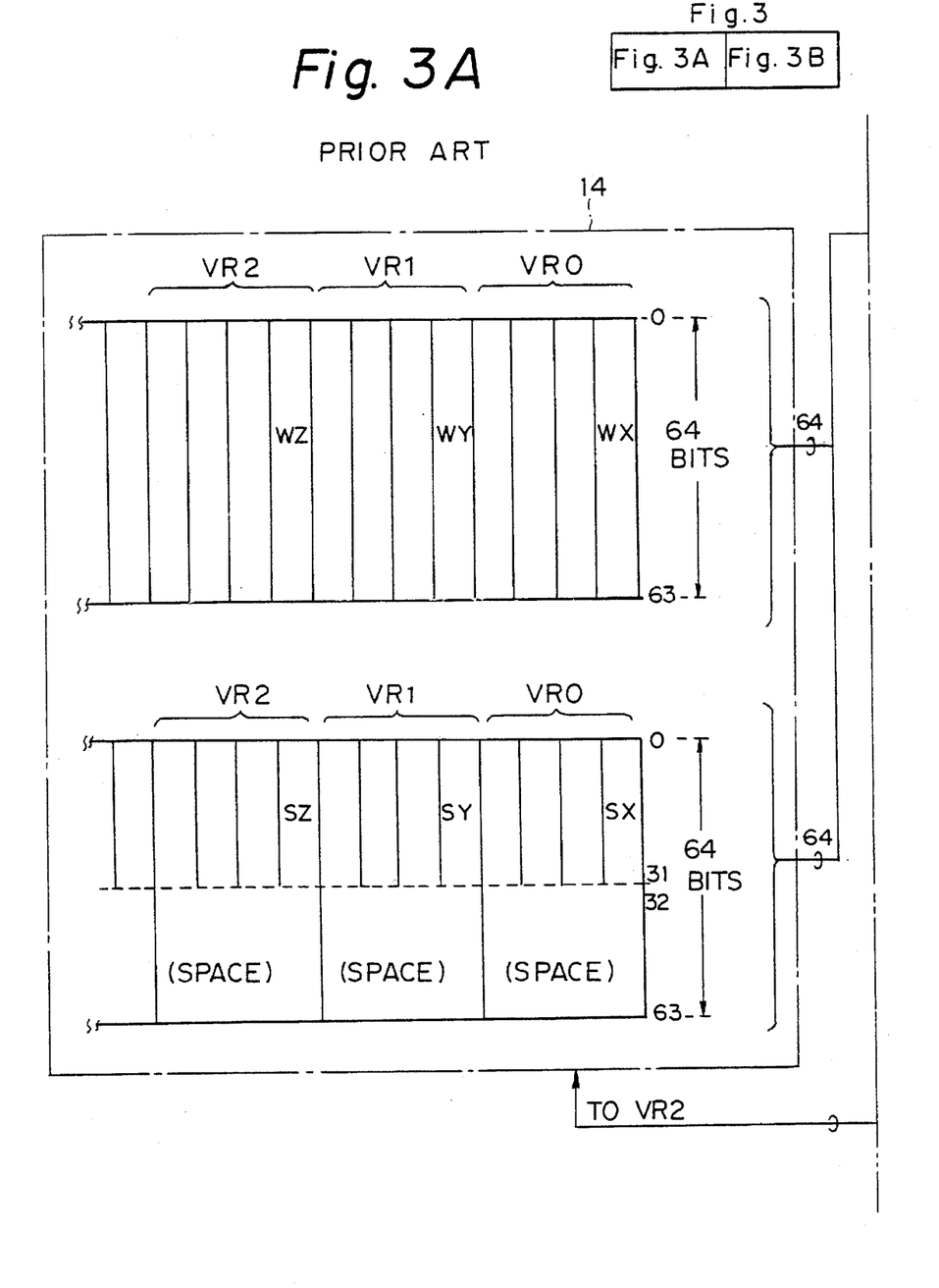
FIG. 3 is a block diagram illustrating FIGS. 3A and 3B.
FIGS. 3A and 3B are detailed circuit diagrams of the add operation pipeline 15 of FIG. 1.
Figure 3B:
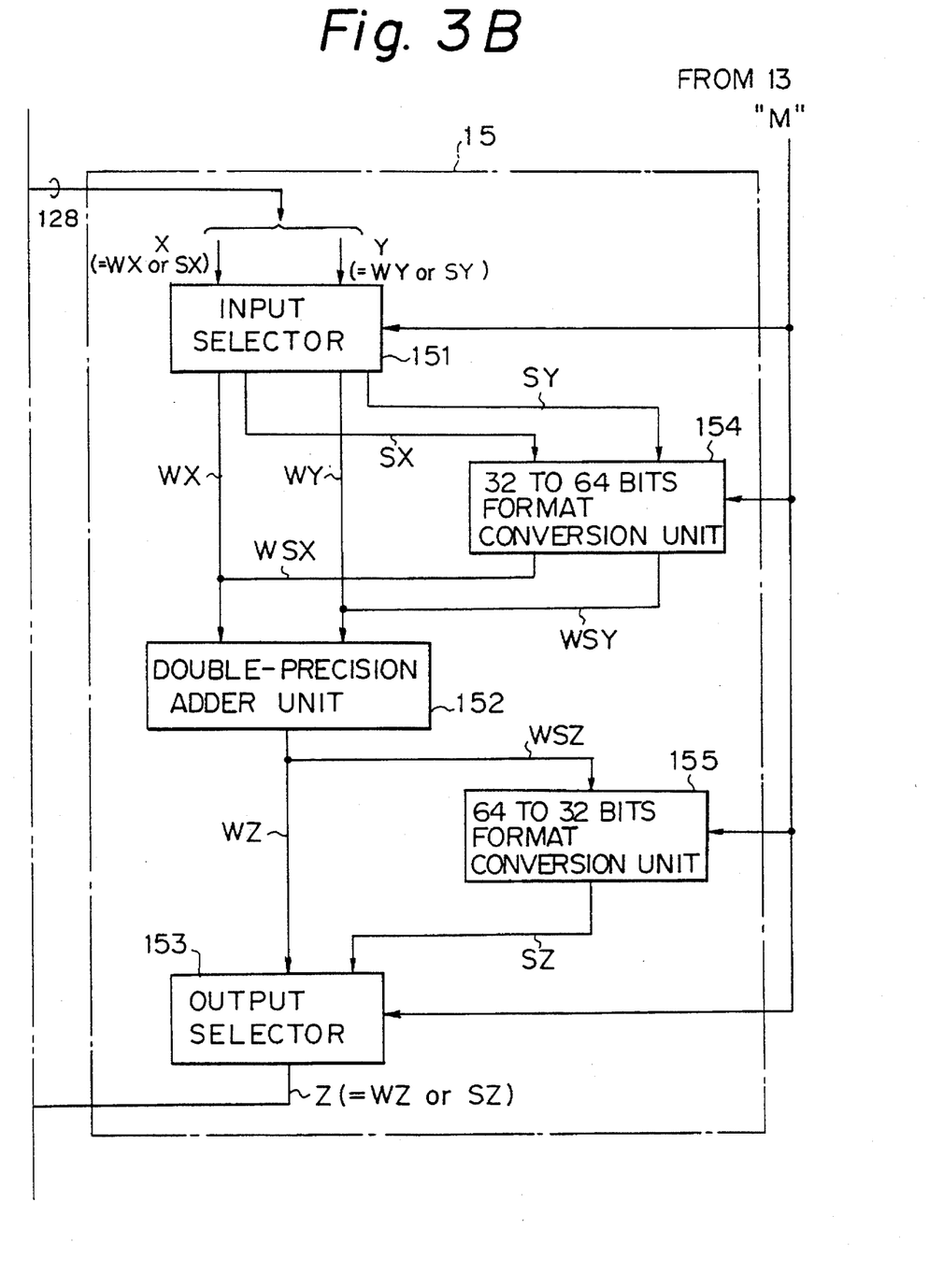

In FIG. 3, which is a detailed circuit diagram of the add operation pipeline 15, the add operation pipeline 15 includes an input selector 151, a double-precision adder unit 152, an output selector 153, a 32 to 64 bits conversion circuit 154, and a 64 to 32 bits conversion unit 155.

For example, in a double-precision add operation mode (M="0"), a double-precision data (64 bits) WX of the vector register VR0 and a double-precision data (64 bits) WY of the vector register VR1 are selected by the input selector 151, and as a result, are transmitted directly to the double-precision adder unit 152, to thereby obtain a resulting double-precision data (64 bits) WZ. Then, the result data WZ is selected by the output selector 153, and as a result, is stored in the vector register VR2.

Conversely, in a single-precision add operation mode (M="1"), a single-precision data (32 bits) SX of the vector register VR0 and a single-precision data (32 bits) SY of the vector register VR1 are selected by the input selector 151, and are transmitted to the 32 to 64 bits conversion unit 154, which converts the single-precision data SX and SY into double-precision data WSX and WSY, respectively. Then, the converted double-precision data WSX and WSY are transmitted to the double-precision adder unit 152 to obtain a result double-precision data (64 bits) WSZ. Again, the result double-precision data WSZ is converted into a single-precision data SZ by the 64 to 32 bit conversion unit 155. This single-precision data SZ is selected by the output selector 153, and as a result, is stored in the vector register VR2.

Thus, in the add operation pipeline 15, a double-precision add operation is carried out by the double-precision adder unit 152, while a single-precision add operation is carried out by the double-precision adder unit 152 associated with the 32 to 64 bits conversion unit 154 and the 64 to 32 bits conversion unit 155.

Figure 4A:
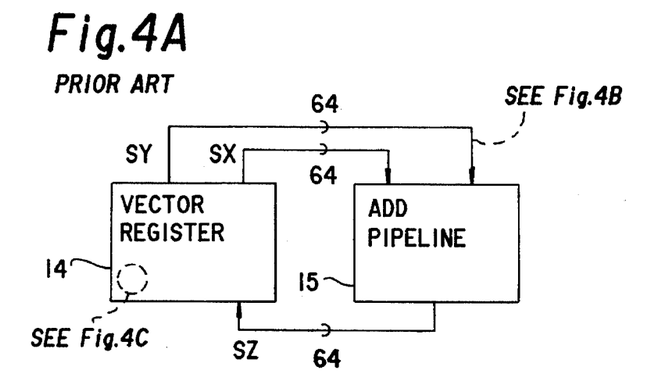
FIGS. 4A–4F are block diagrams explaining the operation of the add operation pipeline of FIG. 3.

In FIG. 3, in a double-precision add mode, no problem arises, but, some problems arise in a single-precision add mode. That is, as shown in FIG. 4A, a space or unused memory area is generated in the vector registers 14, since each of the single-precision data (32 bits) SX, SY, and SZ are stored in the elements of the vector registers 14 having 64-bit regions for double-precision data. Also, a space or unused memory area is generated in bit lines between the vector registers 14 and the add operation pipeline 15, since such bit lines have a capacity for double-precision data.

Figure 4B:
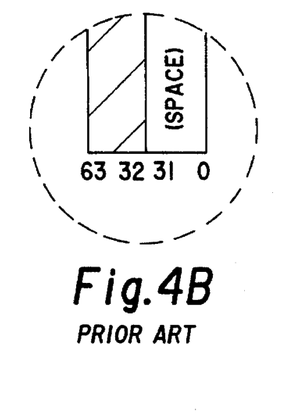
Figure 4C:
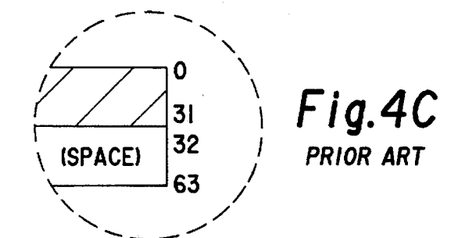
Figure 4D:
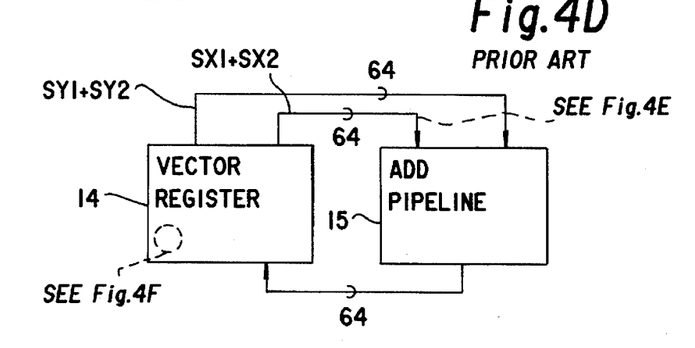
Figure 4E:
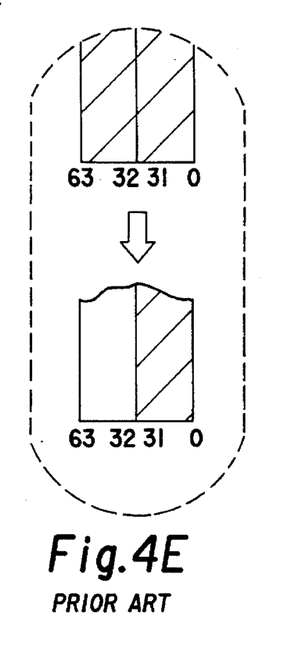
Figure 4F:
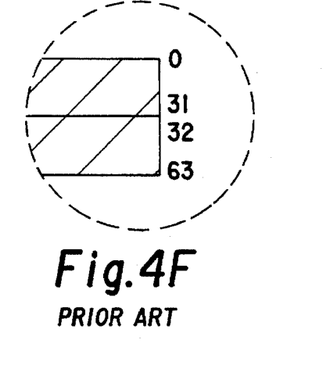

Also, it is possible to store two single-precision data such as SX1 and SX2 into each element of the vector registers 14, as shown in FIG. 4B, and also it is possible to simultaneously transmit such two single-precision data SX1+SX2 via the double-precision bit lines. In this case, the processing of one of the two single-precision data such as SX2 must be delayed until the processing of the other SX1 is completed, since the 32 to 64 bit conversion unit 154 can process only one of the data SX1 and SX2.

Thus, in the add operation unit 15 of FIG. 3, it is impossible to enhance the operation speed for single-precision data.

Note that the multiply operation pipeline 16 has the same configuration as the add operation pipeline 15, except that a double-precision multiplier unit is provided instead of the double-precision adder unit 152. Therefore, the multiply operation pipeline 16 has the same problems as the add operation pipeline 15.

Figures 5, 5A:
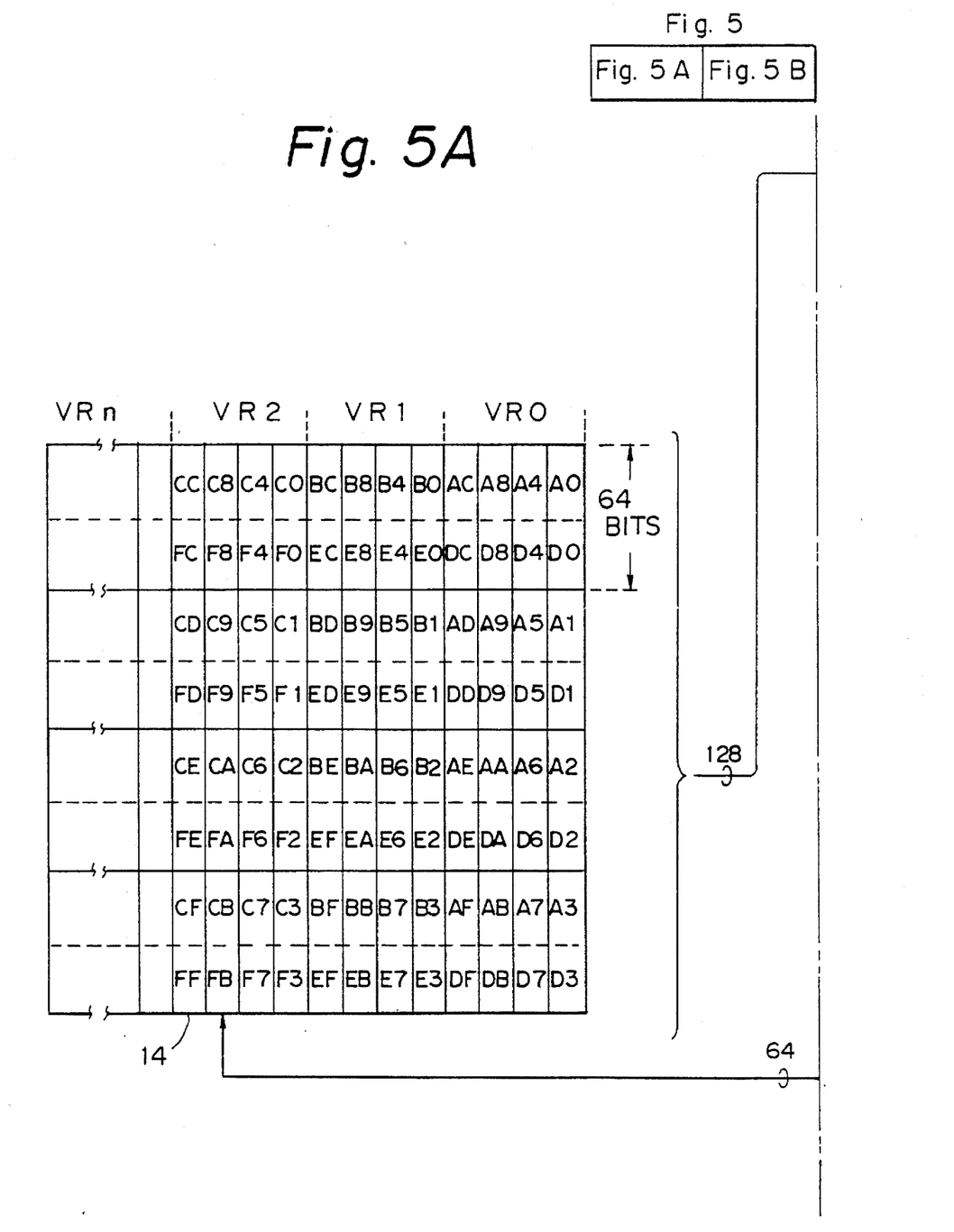
FIG. 5 is a block diagram illustrating FIGS. 5A and 5B.
FIGS. 5A and 5B block circuit diagrams illustrating an embodiment of the data processing system according to the present invention.
Figure 5B:
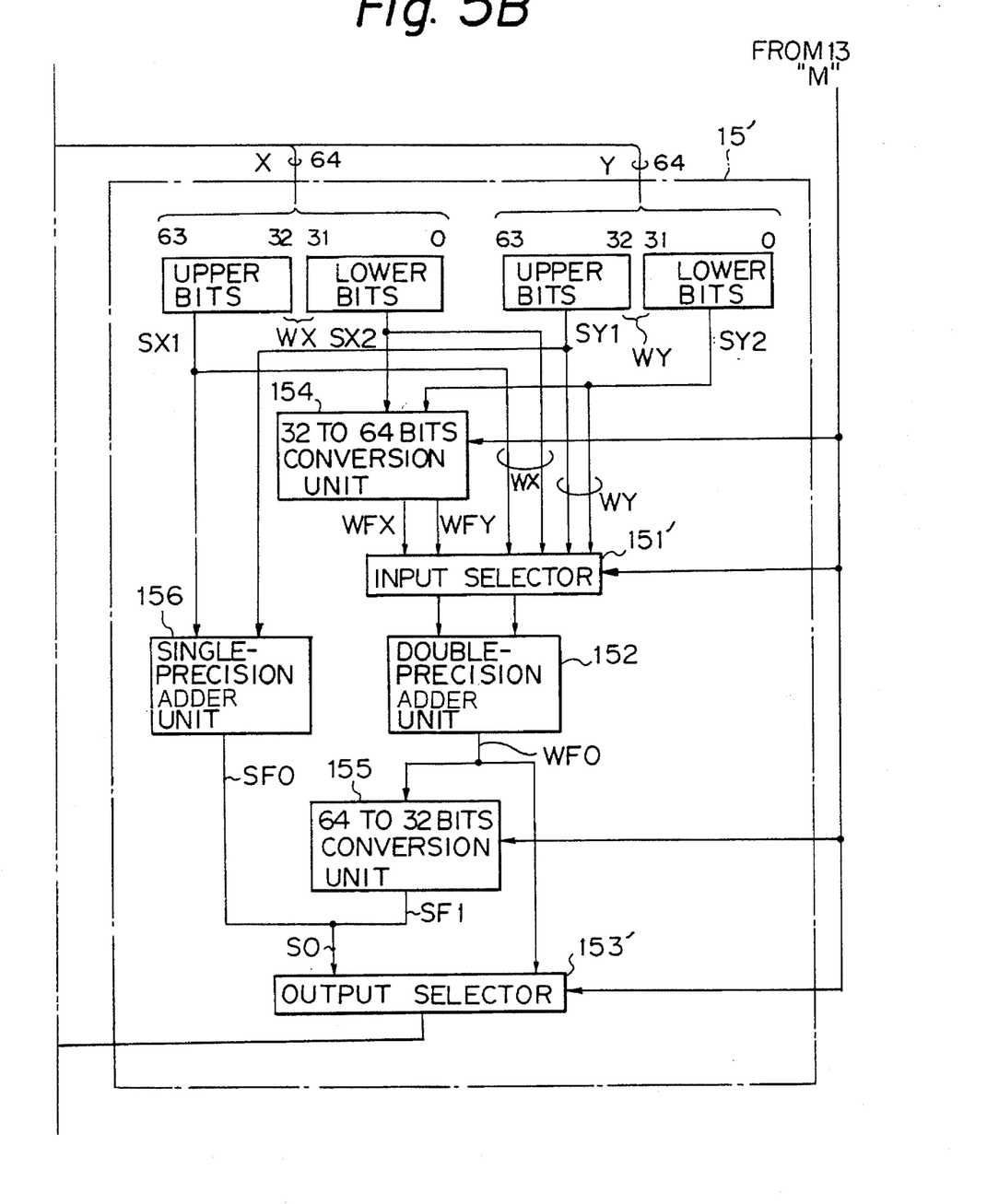

In FIG. 5, which illustrates an embodiment of the add operation pipeline according to the present invention, a single-precision adder unit 156 is added to the elements of the add operation pipeline 15 of FIG. 3, and an input selector 151' and an output selector 153' are similar to the input selector 151 and the output selector 153 of FIG. 3.

In FIG. 5, in a double-precision add operation mode (M="0"), a double-precision data (64 bits) WX and a double-precision data (64 bits) WY are selected by the input selector 151', and as a result, are transmitted to the double-precision adder unit 152, to obtain a result double-precision data (64 bits) WF0. Then, the result double-precision data WF0 is selected by the output selector 153'. Namely, the add operation for double-precision data is substantially the same as that of FIG. 3.

Conversely, in a single-precision add operation mode (M="1"), two kinds of single-precision add operations are carried out. One is carried out by the single-precision adder unit 156, and the other is carried out by the double-precision adder unit 152 with the 32 to 64 bit conversion unit 154 and the 64 to 32 bit conversion unit 155. That is, a single-precision data (32 bits) SX1 and a single-precision data (32 bits) SY1 are transmitted to the single precision adder unit 156, to obtain a result single-precision data (32 bits) SF0. Simultaneously, a single-precision data (32 bits) SX2 and a single-precision data (32 bits) SY2 are transmitted to the 32 to 64 bits conversion unit 154, which converts the single-precision data SX2 and SY2 into double-precision data WFX and WFY, respectively. Then, the converted double-precision data WFX and WFY are transmitted to the double-precision adder unit 152 to obtain a result double-precision data (64 bits) WF0. Again, the result double-precision data WF0 is converted into a single-precision data SZ by the 64 to 32 bit conversion unit 155. Then, the two result single-precision data SF0 SF1 are combined as S0, and the combined single-precision data S0(SF0+SF1) is selected by the output selector 153'. As a result, the combined single-precision data S0 is stored in the vector registers 14.

Figure 6:
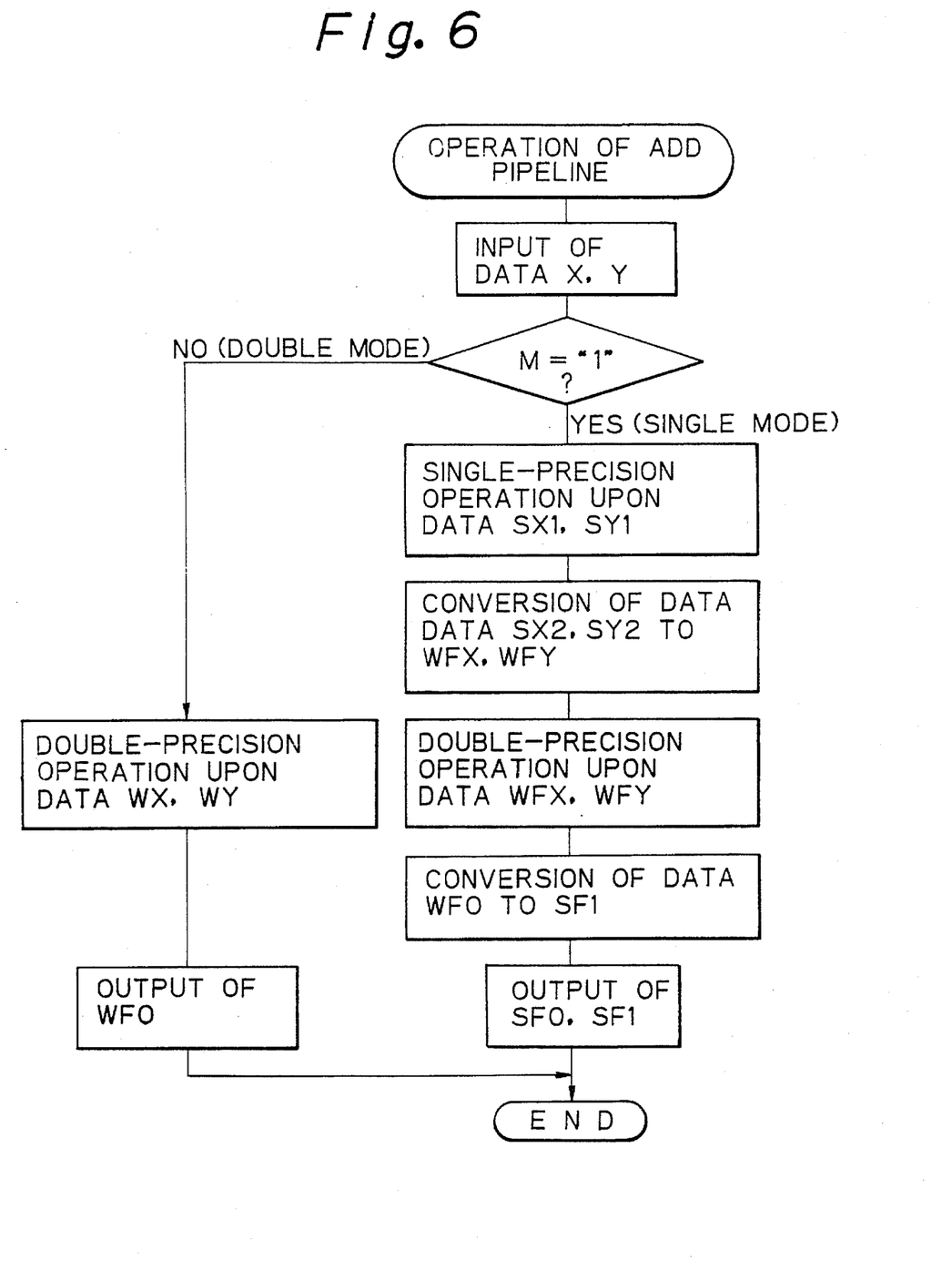
FIG. 6 is a flowchart showing the operation of the add operation pipeline of FIG. 5.

The above-mentioned operation of the add operation pipeline 15' is described briefly in FIG. 6.

Figure 7:
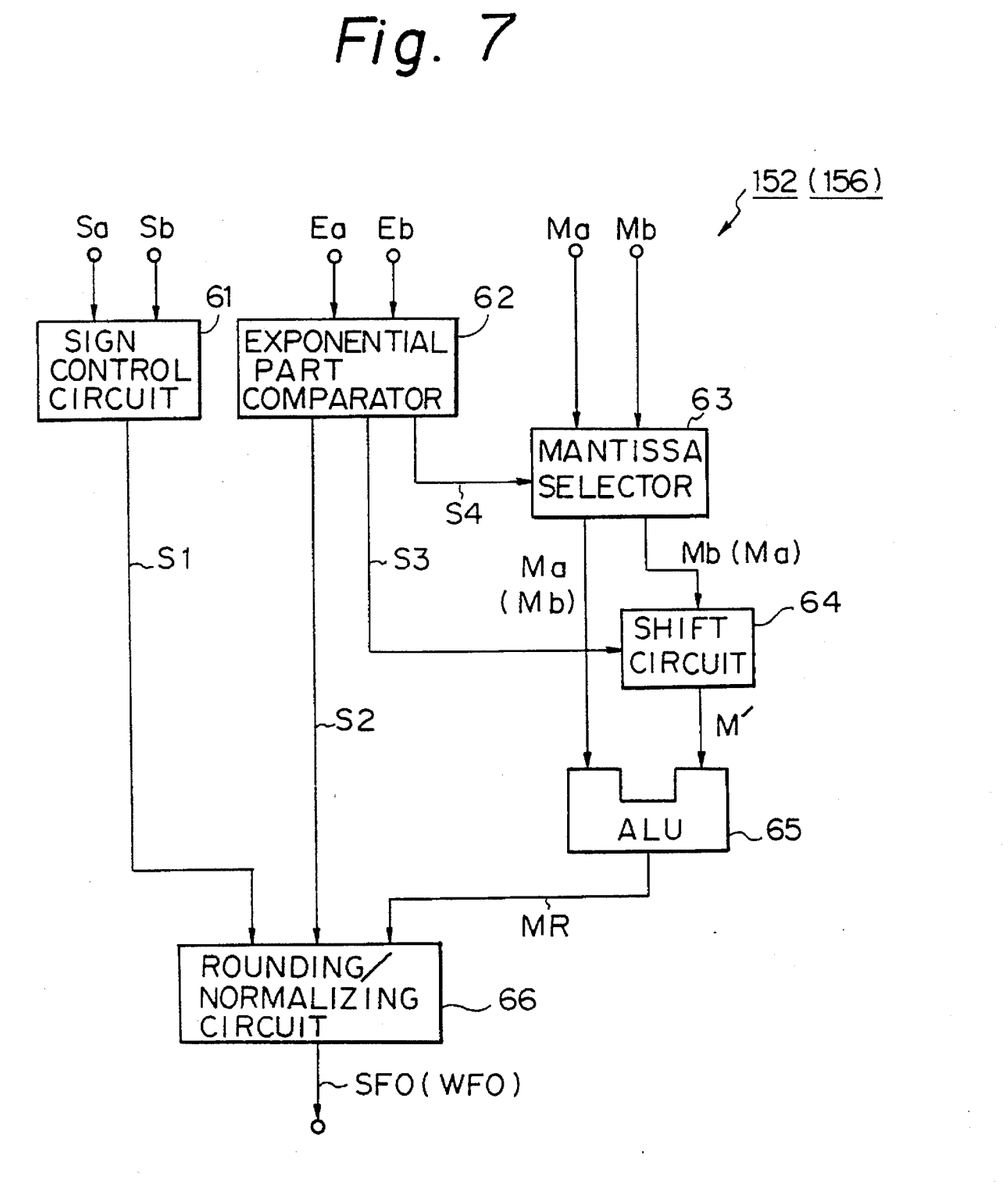
FIG. 7 is a detailed circuit diagram of the adder units of FIG. 5.

FIG. 7 illustrates an example of the double-precision adder unit 152 (or the single-precision adder unit 156). This adder unit includes a sign control circuit 61, an exponential part comparator 62, a mantissa selector 63, a shift circuit 64, an arithmetic and logic unit (ALU) 65, and a rounding/normalizing circuit 66. The adder unit of FIG. 6 processes two floating-point data, each of which is formed by a sign $S_a(S_b)$, an exponential part $E_a(E_b)$, and a mantissa $M_a(M_b)$.

The sign control circuit 61 processes the signs $S_a$ and $S_b$ to generate a signal S1 and transmit it to the rounding/normalizing circuit 66. The exponential part comparator 62 compares the exponential parts $E_a$ and $E_b$ with each other, and generates three signals S2, S3, and S4. Here, the signal S2 designates a larger exponential part of the parts $E_a$ and $E_b$, the signal S2, S3 designates a difference between the parts $E_2$ and $E_b$, and the signal S3 designates whether or not the part $E_a$ is larger than the part $E_b$. The mantissa selector 63 transmits the mantissa parts $M_a$ and $M_b$ to the ALU 65 and the shift circuit 64 in accordance with the signal S4 of the exponential part comparator 62. For example, if the signal S4 indicates that the part $E_a$ is larger than the part $E_b$, the mantissa selector 63 transmits the parts $M_a$ and $M_b$ to the ALU 65 and the shift circuit 64, respectively, and if the signal S4 indicates that the part $E_a$ is not larger than the part $E_b$, the mantissa selector 64 transmits the parts $M_a$ and $M_b$ to the shift circuit 64 and the ALU 65, respectively. In the shift circuit 64, the mantissa part $M_b$ or $M_a$ transmitted from the mantissa selector 63 is shifted by the difference signal S3 between the parts $E_a$ and $E_b$, to obtain a shifted mantissa M'. Then, the ALU 65 performs an add operation upon the mantissa $M_a$ (or $M_b$) and the shifted mantissa M', to obtain a result mantissa MR. Finally, the rounding/normalizing circuit 66 generates a floating-point single-precision or double-precision data in accordance with the signals S1, S2, and MR.

Figure 8:
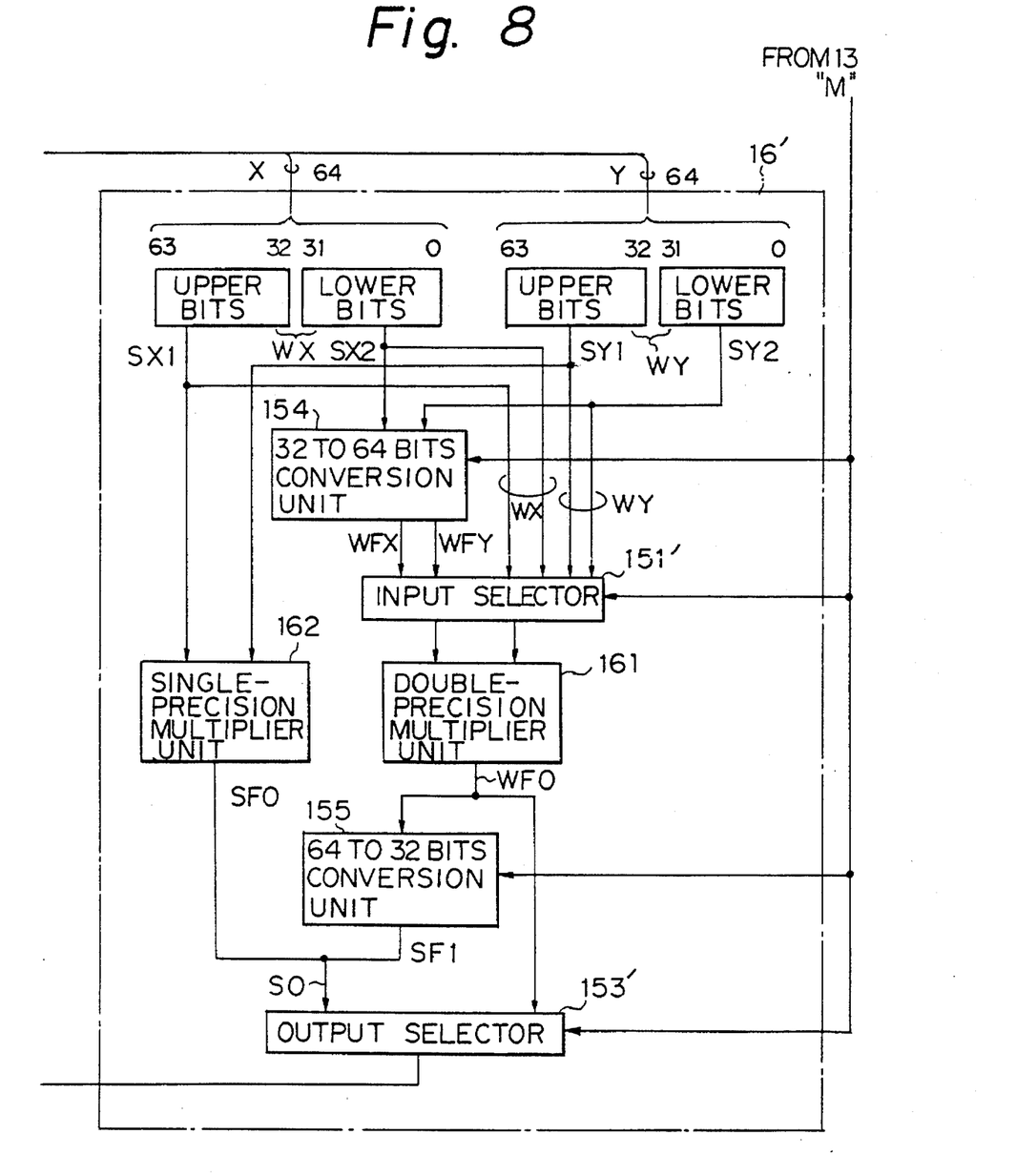
FIG. 8 is a block circuit diagram illustrating another embodiment of the data processing system according to the present invention.

In FIG. 8, which is a detailed circuit diagram of the multiply operation pipeline according to the present invention, this multiply operation pipeline 16' has a similar configuration to that of the add operation pipeline 15' of FIG. 5, except that a double-precision multiplier unit 161 and a single-precision multiplier unit 162 are provided instead of the double-precision adder unit 152 and the single-precision adder unit 156. Such multipliers can be easily formed by using Booth's arigorithm multipliers or the like.

Figure 9:
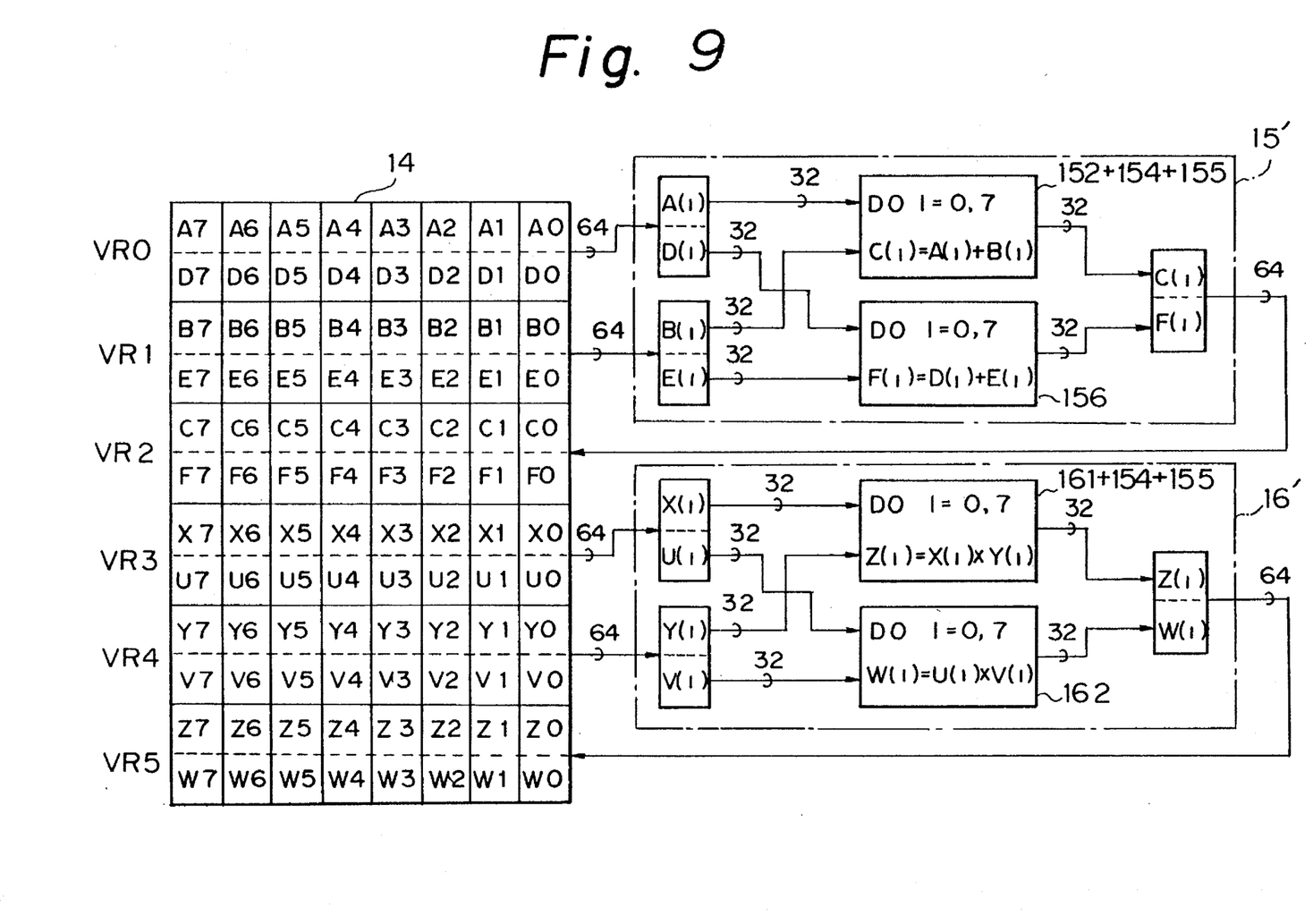
FIG. 9 is a circuit diagram of a combination of the circuits of FIGS. 5 and 8.

In FIG. 9, which is a block circuit of a combination of the add operation pipeline 15' of FIG. 5 and the multiply operation pipeline 16' of FIG. 7, only the elements required for a single-precision operation are illustrated. For example, in the add operation pipeline 15', a single-precision data (32 bits) A(I) of the vector register VR0 and a single precision data (32 bits) D(I) of the vector register VR0 are added at the double-precision adder unit 152 plus the units 154 and 155, and an addition result (32 bits) C(I) is stored in the vector register VR2. Simultaneously, a single-precision data (32 bits) B(I) of the vector register VR1 and a single precision data (32 bits) E(I) of the vector register VR1 are added at the single-precision adder unit 156, and an addition result (32 bits) F(I) is stored in the vector register VR2.

Similarly, in the multiply operation pipeline 16', a single-precision data (32 bits) X(I) of the vector register VR3 and a single precision data (32 bits) U(I) of the vector register VR3 are multiplied at the double-precision multiplier unit 161 plus the units 154 and 155, and a multiply result (32 bits) Z(I) is stored in the vector register VR5. Simultaneously, a single-precision data (32 bits) Y(I) of the vector register VR4 and a single precision data (32 bits) V(I) of the vector register VR4 are multiplied at the single-precision multiplier unit 156, and an addition result (32 bits) F(I) is stored in the vector register VR5.

As is clear in FIG. 9, there is no space or unused memory area in the vector registers 14 and the transmission bit lines, and since two single-precision operations can be simultaneously carried out, there is no delay for such operations.

Figure 10A:
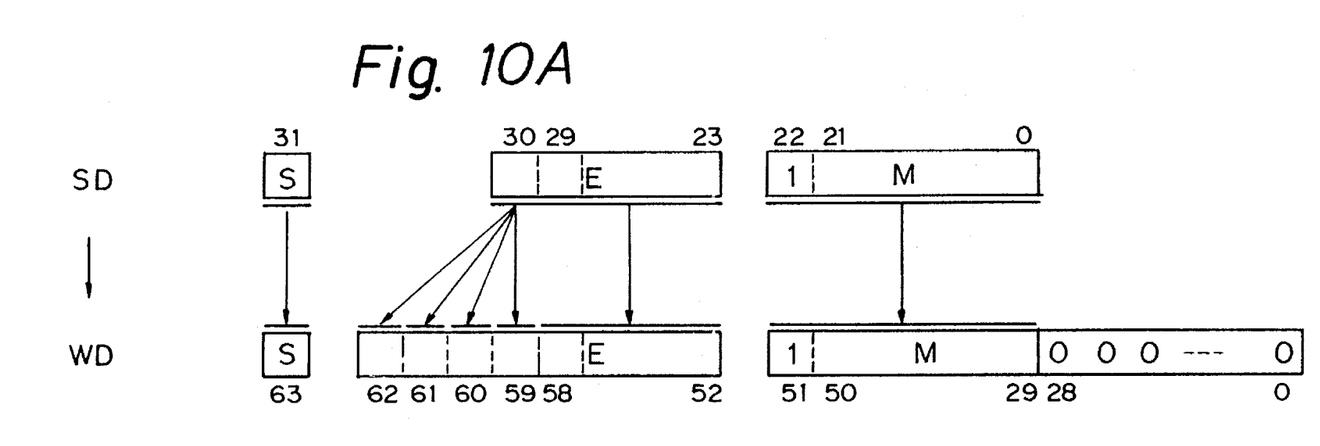
FIGS. 10A and 10B are circuit diagrams of the 32 to 64 bit conversion unit and the 64 to 32 bit conversion unit of FIGS. 3, 5, and 8.

In FIG. 10A, which is a circuit diagram of the 32 to 64 bit conversion unit 154 of FIGS. 3, 5, and 8, since an exponential part is represented by 2's complement, a 30-th bit of a single-precision data SD is allocated to the 62-th, 61-th, 60-th, and 59-th bits of a double-precision data WD, and the 29-th to 23-th bits of the single-precision data SD is allocated to the 58-th to 52-th bits, of respectively, of the double-precision data WD. Also, in a mantissa part M, "0" is allocated to the 28-th to 0-th bits of the double-precision data WD, and the 22-th to 0-th bits of the single-precision data SP are allocated to the 51-th to 29-th bits of the double-precision data WD. Note that a 22-th bit of the single-precision data SD and a 51-th bit of the double-precision data WD is always "1".

Figure 10B:
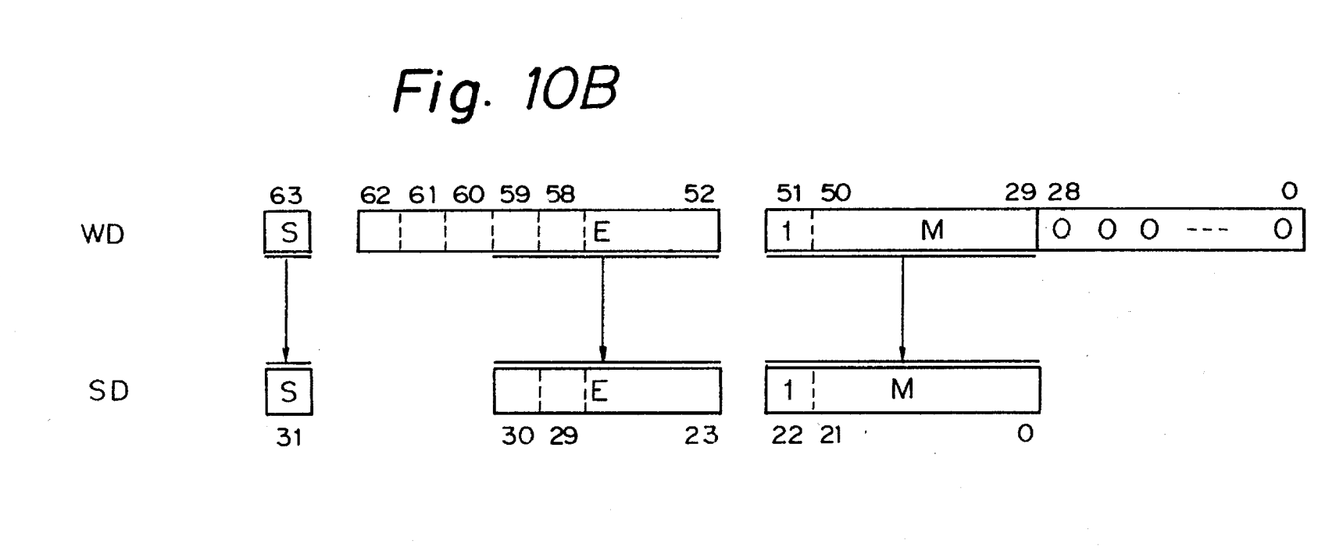

In FIG. 10B, which is a circuit diagram of the 64 to 32 bit conversion unit 155 of FIGS. 3, 5, and 8, the 59-th to 52-th bits of a double-precision data WD are allocated to the 3-th to 23-th bits, respectively, of a single-precision data SD, and the 51-th to 29-th bits of the double-precision data WD are allocated to the 22-th to 0-th bits, respectively, of the single-precision data SD.

Note that, if the above-mentioned single-precision data SD is formed by other bits such as 8 bits, 64 bits, etc., a double-precision data WD can be formed by 16 bits, 128 bits, etc.

Also, the above-mentioned add operation pipeline or multiply operation pipeline can be formed by a single-chip LSI.

As explained above, according to the present invention, in a single-precision data processing, no space or unused memory area remains in a memory (vector registers) and bit lines, and further, single-precision operations can be carried out at a high speed.

We claim:

1. A data processing system comprising:

first, second, third, and fourth receiving means for receiving a first data, a second data, a third data, and a fourth data, respectively, each of said first to fourth data forming a single-precision data in a single-precision operation mode, said first and second data forming a first double-precision data in a double-precision operation mode, said third and fourth data forming a second double-precision data in a double-precision operation mode;

a single-precision data to double-precision data conversion unit, connected to said second and fourth receiving means, for converting said second data of a single-precision data type and said fourth data of a single-precision type into third double-precision data and fourth double-precision data, respectively, in a single-precision operation mode;

a single-precision operation unit, connected to said first and third receiving means, for performing a single-precision operation upon said first and third data to obtain a first single-precision result data in a single-precision operation mode;

a double-precision operation unit, connected to said first to fourth receiving means, and to said single-precision data to double-precision data conversion unit, for performing a double-precision operation upon said third and fourth double-precision data in a single-precision operation mode and for performing a double-precision operation upon said first and second double-precision data in a double-precision operation mode, to obtain a double-precision result data;

a double-precision data to single-precision data conversion unit, connected to said double-precision operation unit, for converting said double-precision result data to a second single precision result data in a single-precision operation mode; and transmitting means, connected to said single-precision operation unit, said double-precision data to single-precision data conversion unit, and said double-precision operation unit, for transmitting said first and second single-precision result data to an exterior in a single-precision mode, and for transmitting said double-precision result data to the exterior in a double-precision operation mode wherein in said double-precision operation mode, only said double-precision operation unit operates and said single-precision operation unit is non-operational and in said single-precision operation mode, said double-precision and single-precision operation units operate simultaneously.

2. A system as set forth in claim 1, further comprising a selector, connected to a prestage of said double-precision operation unit, for selecting said third and fourth double-precision data in a single-precision operation mode, and for selecting either one of said first and second double-precision data in a double-precision operation mode.

3. A system as set forth in claim 1, wherein said single-precision and double-precision operation units comprise adders.

4. A system as set forth in claim 1, wherein said single-precision and double-precision operation units comprise multipliers.

5. A system as set forth in claim 1, further comprising:

vector registers each having a plurality of double-precision elements; and internal double-precision buses connected between said vector registers and said first to fourth receiving means, and connected between said vector registers and said transmitting means.

6. A data processor comprising:

a first operation unit for carrying out a single-precision operation;

a second operation unit for carrying out a single-precision operation simultaneously with said first operation unit and said second operation unit for carrying out a double-precision operation while said first operation unit is non-operational;

a data bus which can transmit double-precision data in parallel therethrough;

a first means, connected to said data bus, for supplying a double-precision data to said data bus during a double-precision operation mode and for supplying two sets of single-precision data to said data bus during a single-precision operation mode; and a second means, connected to said data bus and said first and second operation units, for supplying the double-precision data on said data bus to said second operation unit during a double-precision operation mode, and for supplying one of the two sets of single-precision data to said first operation unit and the other to said second operation unit during a single-precision mode.

* * * * *